D. H. THAYER.
HARVESTER.
No. 31,854. Patented Mar. 26, 1861.
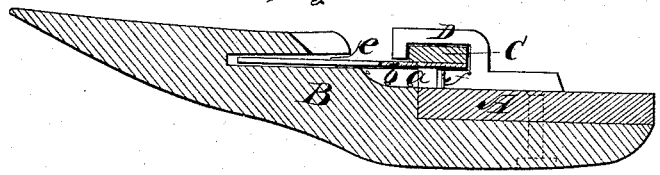
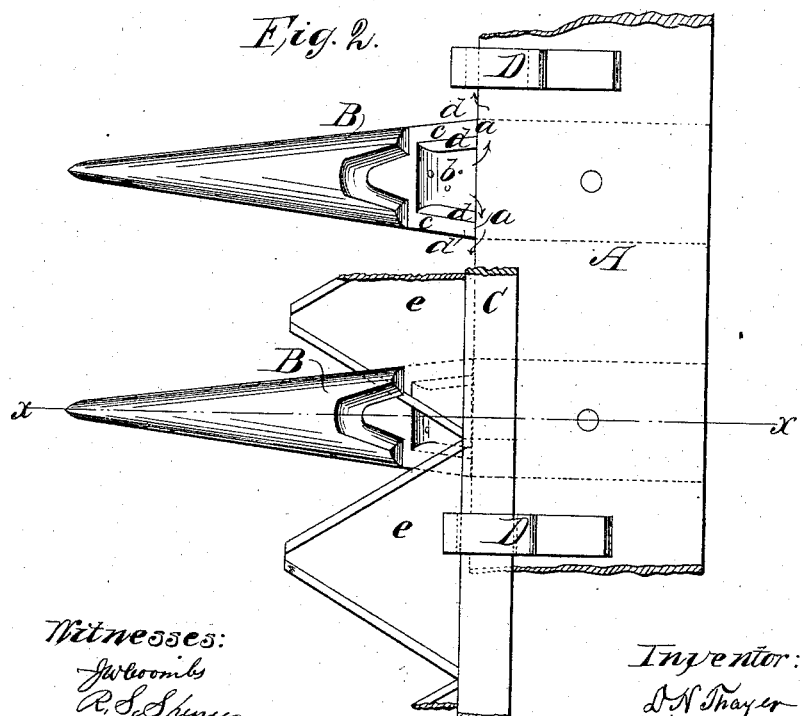

UNITED STATES PATENT OFFICE.

DANIEL H. THAYER, OF LANSING, NEW YORK, ASSIGNOR TO HIMSELF AND STEPHEN A. BAKER, OF SAME PLACE.

IMPROVEMENT IN THE CUTTING APPARATUS OF HARVESTERS.

Specification forming part of Letters Patent No. 31,854, dated March 26, 1861.

*To all whom it may concern:*

Be it known that I, DANIEL H. THAYER, of Lansing, in the county of Tompkins and State of New York, have invented a new and useful Improvement in Grain and Grass Harvesters; and I do hereby declare that the following is a full, clear, and exact description of the same, reference being had to the annexed drawings, making a part of this specification, in which—

Figure 1 is a section of my invention, taken in the line $x\ x$, Fig. 2. Fig. 2 is a plan or top view of the same.

Similar letters of reference indicate corresponding parts in the two figures.

To enable those skilled in the art to fully understand and construct my invention, I will proceed to describe it.

A represents the finger-bar of a harvester, or a portion of one, with two fingers, B B, attached. These fingers are of the usual open-top form, and may be constructed as usual, with the exception that their back parts or shoulders, $a$, which adjoin or abut against the finger-bar, project above the latter a certain distance, as shown in Fig. 1. The back parts of the fingers B, just in front of the shoulders $a$, are recessed or hollowed out, as shown at $b$, and these recesses at their back parts extend down to a level with the upper surface of the finger-bar A, as shown clearly in Fig. 1. The recesses $b$, it will be seen by referring to Fig. 2, form a narrow wall, $c$, and two cutting-edges, $d\ d$, at each side of each finger.

C represents a cutter-bar, to which the usual V-shaped teeth, $e$, are attached. The cutter-bar C is fitted in guides D, attached to the finger-bar A, and these guides are sufficiently elevated to allow the teeth $e$ to work on the back parts of the fingers. This arrangement admits of a space between the sickle and finger bar, as shown clearly in Fig. 1. The guides D it will be noticed, have projections $f$ on their lower parts, which constitute supports on which the cutters rest, and these projections also serve to assist the clearing of the cutters, as the latter reciprocate, of any adhering matter.

From the above description it will be seen that as the sickle is operated back and forth on the fingers B all substances that may be drawn underneath the teeth $e$ will pass down through the recesses $b$ and out underneath the cutter-bar C, as indicated by the red arrows, and a free escape being thus allowed for said substances, the sickle is effectually prevented from choking or clogging, and also from gumming up, as the moisture contained in grass has no opportunity to collect underneath the sickle on the bearing-surfaces $c$ of the fingers and deposit its resinous or gummy substance which it holds in solution.

This invention has been practically tested and has been found to operate well, cutting clean without any tendency to choke or clog.

Having thus described my invention, what I claim as new, and desire to secure by Letters Patent, is—

The arrangement of the cutters $e$ and cutter-bar C with the supporting-projections $f$, knife-edged, backward-opening recesses $b$, space between the projections and fingers, and finger-bar A, in the manner and for the purpose herein shown and described.

DANIEL H. THAYER.

Witnesses:
A. J. PRENTICE,
L. G. BAKER.